United States Patent Office.

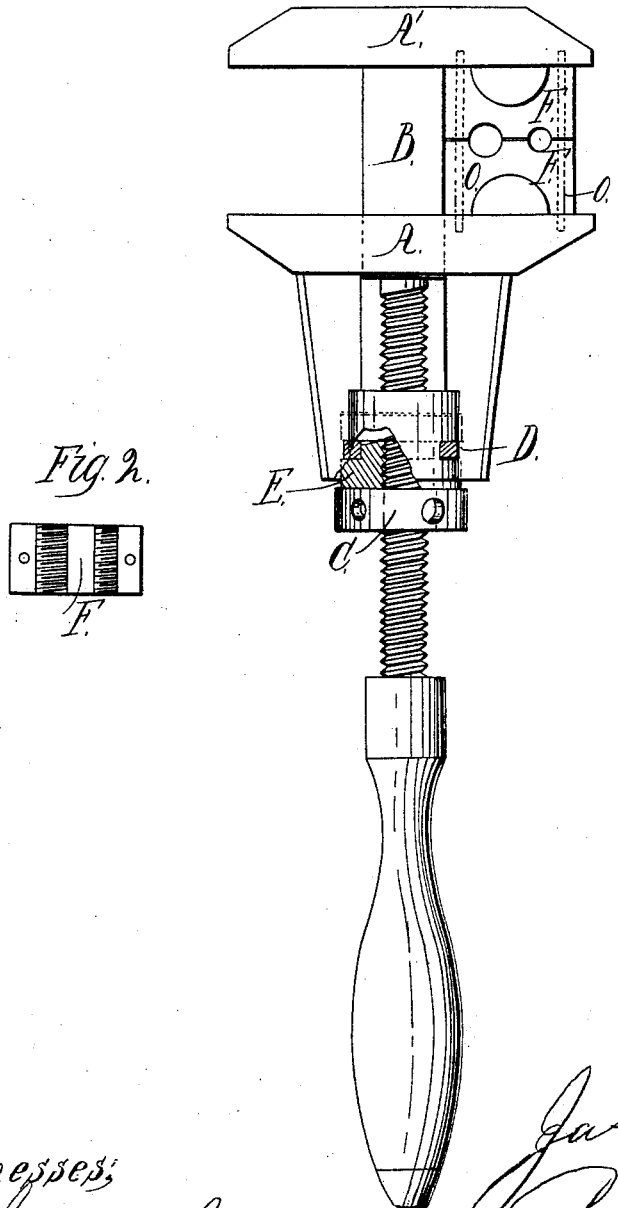

IMPROVED TOOL.

JAMES A. SMITH, OF NEW YORK.

Letters Patent No. 59,866, dated November 20, 1866.

SPECIFICATION.

TO ALL WHOM IT MAY CONCERN:

Be it known that I, JAMES A. SMITH, of the city, county, and State of New York, have invented a new and improved Tool, the same constituting both a die-plate and wrench; and I do hereby declare that the following is a full, clear, and exact description thereof, which will enable others skilled in the art to make and use the same, reference being had to the accompanying drawing forming part of this specification.

The object of my invention is to combine a die-plate, supplied with a number of dies for cutting screw-threads upon bolts, and at the same time have a wrench, the jaws of which may be moved or made to approach and recede from each other for the purpose of bringing it to the capacity of different-sized nuts, thus combining the two tools in one without making them cumbersome, thus accomplishing the object designed.

To enable others skilled in the art to make and use my invention, I will proceed to describe its construction and operation.

Figure 1 is a longitudinal elevation of my improved tool.

Figure 2 is a sectional view of one of the dies.

Letters of like name and kind refer to like parts in each of the figures.

A A' represents the two jaws of my improved tool. The jaw A is made fast to the end of the bar B. A is the other jaw, which is made to approach and recede from the jaw A' by means of a screw-thread made in the nut $c$, which works over a corresponding screw-thread upon the bar B. This nut, $c$, is attached to the end of the jaw A by means of shoulders, which fit and turn in an annular groove or recess made in the said nut, as seen at D, where a portion of the rear part of the jaw is broken out for the purpose of showing the screw and recess, F F, and the dies placed and secured in the jaws by means of pins, $o$ $o$, as shown in dotted lines. They may be held still more firm by turning up the jaws hard against them. H is the handle secured to the shank of the bar B.

Having thus described my invention, what I claim as new, and desire to secure by Letters Patent, is—

The combination of the rods $o$ $o$ with the dies F F, jaws A A', bar B, and nut C, substantially as and for the purpose specified.

JAMES A. SMITH.

Witnesses:
JAMES L. ERVIN,
EDGAR B. TRUESDALE.